April 10, 1945. N. MILLER 2,373,327
LIGHT METER
Original Filed April 1, 1940 3 Sheets-Sheet 1

Inventor
Nicholas Miller
By
Attorney

April 10, 1945.  N. MILLER  2,373,327
LIGHT METER
Original Filed April 1, 1940  3 Sheets-Sheet 2

Inventor
Nicholas Miller
By
Attorney.

April 10, 1945. N. MILLER 2,373,327
LIGHT METER
Original Filed April 1, 1940 3 Sheets-Sheet 3
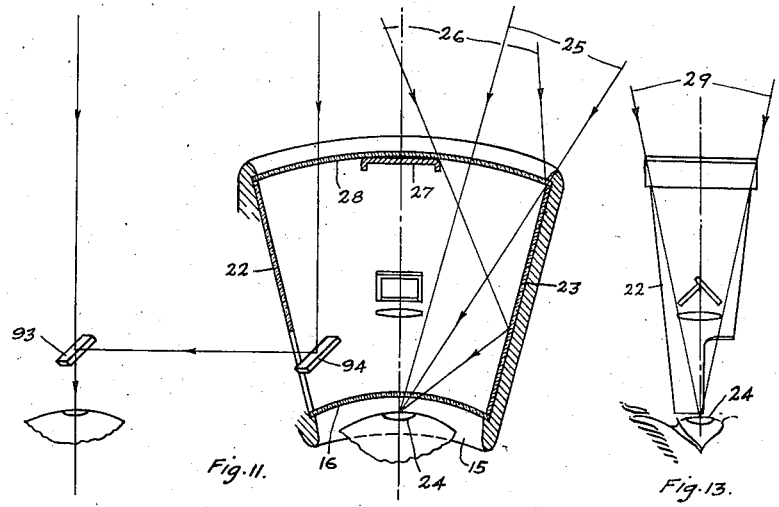
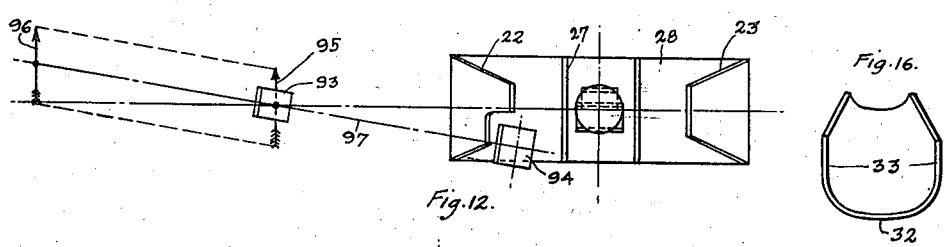
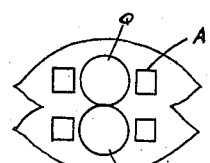
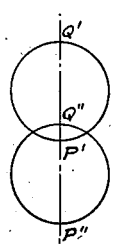
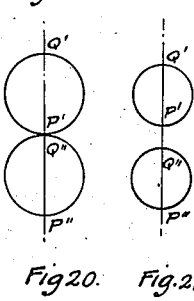
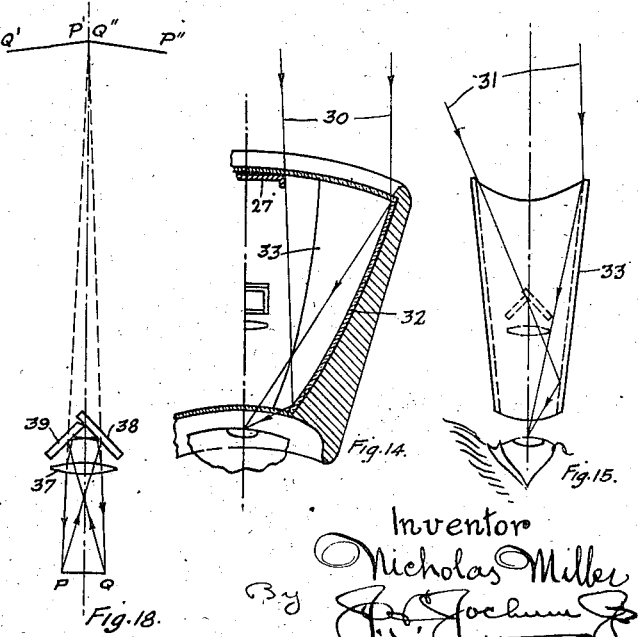

Patented Apr. 10, 1945

2,373,327

UNITED STATES PATENT OFFICE 2,373,327

LIGHT METER

Nicholas Miller, Berwyn, Ill.

Original application April 1, 1940, Serial No. 327,238, now Patent No. 2,296,292, dated September 22, 1942. Divided and this application September 2, 1942, Serial No. 457,063

15 Claims. (Cl. 88—23)

This application is a division of application Serial Number 327,238, filed April 1, 1940, and relates more specifically to the determination of light intensities by the measurement of the pupillary diameters of the human eye, as it is affected by the light falling upon it.

For elements and mechanisms shown on the drawings, but not described in this specification, reference is to be had to my issued Patent No. 2,296,292, September 22, 1942.

In the present invention improvements are provided whereby the light rays which reach and influence the pupil of the eye, are definitely limited to a field of rays, which correspond to the field covered by the camera objective. The effect of this restricted light field upon the pupillary opening is that produced by the average of the light intensities proceeding from all points of the object field, so that by this means the proper exposure required by any given scene may be accurately determined.

Another improvement consists of fixed reflectors positioned in such a way, that light rays proceeding from the object field are intercepted by said reflectors, and directed upon the eye, so that the light falling upon the pupil is sufficient to produce pupillary images which may be clearly observed even in dim light.

A further improvement consists of a focusing means whereby the image forming lens and reflectors are adapted to be shifted in an axial direction, so that the instrument can be adjusted to yield sharp pupillary images either for normal or for defective vision, and this is accomplished without changing the position of the instrument relative to the observer's eye. A vision dial is provided with a scale, for setting the instrument corresponding to near vision, normal vision, and far vision; intermediate positions are also indicated so that the instrument may be preset, if desired.

For calibrating the instrument an adjustable screw is provided with graduation marks, and by means of this screw, the angular relation between the image forming reflectors may be altered to correspond to the individual variation of the pupillary diameters.

It is to be understood that the principles of pupillary measurements herein disclosed are not restricted to exposure determinations in the field of photography, but have other useful applications, as for example, in determining the light intensities or artificial illumination, which are necessary in the performance of certain tasks, such as reading, sewing, etc., since the optimum conditions for these are related to a predetermined pupillary opening for each individual.

To the attainment of these ends and the accomplishment of other new and useful objects as will appear, the invention consists in the features of novelty in substantially the construction, combination and arrangement of the several parts, hereinafter more fully described and claimed and shown in the accompanying drawings, and in which Figure 1 represents an enlarged top view of the instrument with the exposure meter and range finder dials removed to more clearly show the construction.

Figure 11 is a schematic horizontal section showing the path of rays to the exposure meter and the range finder.

Figure 12 is a partial front elevation of Figure 11.

Figure 13 is a partial side view of Figure 11.

Figure 14 is a partial schematic sectional view similar to Figure 11 showing the reflection of rays from a parabolic type reflector.

Figure 15 is a partial side view of Figure 14.

Figure 16 is an end view of the reflector shown in Figure 15.

Figure 17 is a diagrammatic view showing the appearance of the images of the eye and of the pupillary images.

Figure 18 is a sectional diagrammatic view of the lens and reflector combination and the path of the rays forming the pupillary images.

Figures 19, 20 and 21 show the two pupillary images in various positions relative to one another.

Figure 1:
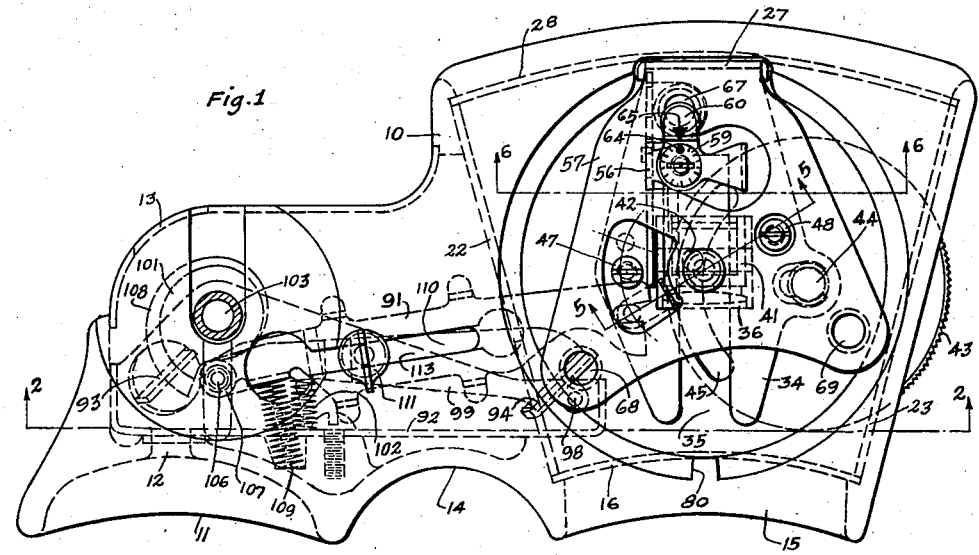
Figure 2:
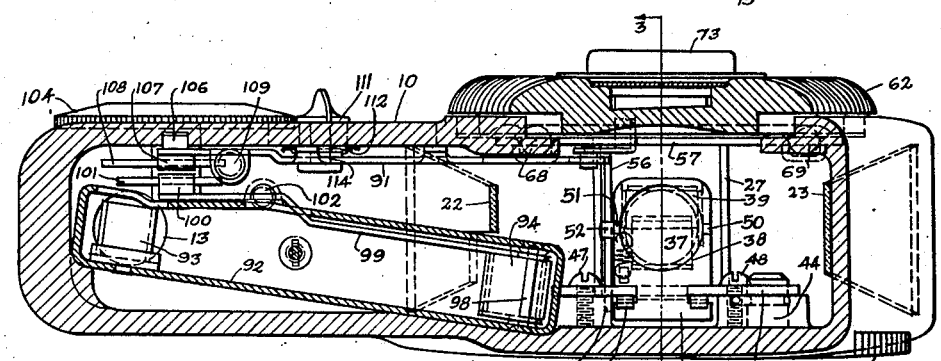
Figure 2 is a sectional view taken along line 2—2 Figure 1.
Figure 3:
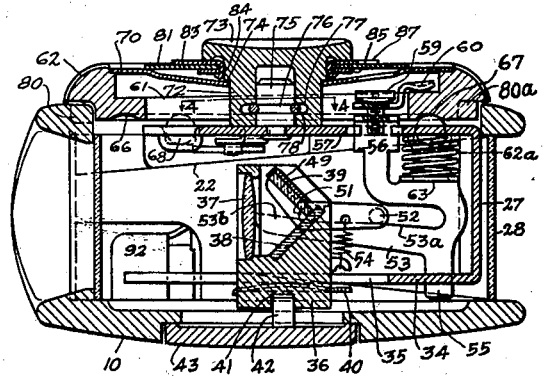
Figure 3 is a sectional view taken along line 3—3 Figure 2.

In Figures 1, 2 and 3, the numeral 10 represents a casing which is made preferably of a plastic material such as Bakelite. Inside this casing are mounted the component parts of the exposure meter. The lower right side of the casing is provided with an oval shaped opening 15, Figures 1, 7 and 8, adapted to accommodate the right eye, which is used in operating the exposure meter.

A transparent arcuate member 16 is provided to seal the oval opening, and to allow the light rays to pass to illuminate the pupil of the eye. On the two sides of the oval shaped opening are positioned the reflectors 22 and 23, Figures 1, 2, 3, 11, 12 and 13. The right eye and its pupil is shown schematically in Figures 11 and 13 at 24; the numeral 25 represents the direct rays which reach the center of the pupil, and 26 represents the rays reflected by the reflector 23 reinforcing the direct rays in illuminating the pupil. These groups of rays 25 and 26 illustrate how the available rays are limited to a definite angle by the edge of the casing on the right side, and by the upright part of the frame member 27 on the left side of the opening. The numeral 28 is an arcuate transparent member for sealing the openings on the two sides of the upright frame member 27.

A similar group of rays (not shown) reaches the pupil through the opening on the left side of the member 27. In Figure 13, 29 shows the limitation of rays in a vertical plane, so that when the instrument is pointed at an object, sky light will be excluded from reaching the eye. In Figure 14 a parabolic reflector 32 further restricts the angle of the reflected rays, since those that reach the center of the pupil are the parallel groups of rays 30.

In Figures 14, 15 and 16, the reflector 32 is shown provided with flanges 33 so that a transverse section of the mirror is U shaped as appears from the end view, Figure 16.

In Figure 15, rays 31 show the flanges 33 reflecting rays to the pupil which, however, are limited to a small angle. These rays are additional to the direct rays which reach the pupil, as shown at 29, Figure 13. The operation of the exposure meter depends upon the response of the pupil opening to the stimulus induced by the light which is incident upon the eye. This response is measured by means of two enlarged virtual images of the illuminated pupil, formed by a lens and double reflector combination.

To simplify the description of the functions of the double reflectors, suppose that in Fig. 18 the lens 37 is removed. Then, if the two reflectors 38 and 39 were disposed exactly at right angles, one relative to the other, they would form a single inverted virtual image of an illuminated object such as the pupil PQ. If, however, the angle between the reflectors is altered, so that, for example, it becomes slightly less than a right angle, then two virtual images of the illuminated pupil will be visible to the eye: one image formed by the rays proceeding from the pupil and incident upon the reflector 38, and reflected from it to the reflector 39, which reflects the rays back into the pupil. The second pupil image is formed in a similar way, but by rays which are incident first upon the reflector 39, and then reflected from it to the reflector 38. It is to be noted that all rays proceeding from the illuminated pupil undergo reflections at both of the reflectors before they are directed back into the pupil, causing the two images to become visible to the eye.

The function of the lens 37 in front of the reflectors is to magnify the pupil images, and does not affect the principle of double image formation as above described. By a suitable choice of the position and of the focal length of the lens 37, the magnification of the pupil images, and their distance from the eye, can be predetermined.

If the angle between the reflectors 38 and 39 is so adjusted that the two images just touch one another, as at P'Q'', then it can be shown that the magnitude of this angle is dependent upon the diameter of the pupil, so that this angle becomes a measure of the pupil diameter.

In Figure 18, PQ represents the illuminated pupil, and the paths of the reflected rays are shown as proceeding from the point of tangency of the enlarged virtual images Q'P' and Q''P'' of the pupil. The appearance of these images, as seen by the observer, is shown in Figure 20. If the reflectors 38 and 39 remain in their adjusted positions of Figure 18, and the light intensity incident upon the pupil diminishes, the pupil dilates and its virtual images will be overlapping as shown in Figure 19, the degree of overlap P'Q'' depending upon the reduction in light intensity incident upon the pupil.

Similarly, increased light intensity will cause contraction of the pupil and the separation of the pupil images as shown at P'Q'', Fig. 21, in accordance with the increase of light intensity incident upon the pupil.

Figure 22:
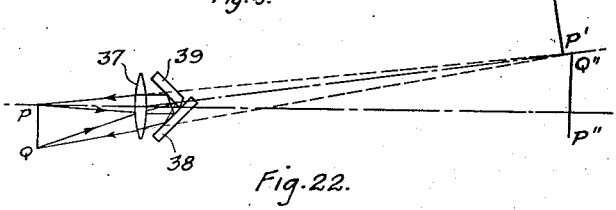
Figure 22 shows the alinement of the pupillary images when the pupil is below the optic axis.
Figure 23:
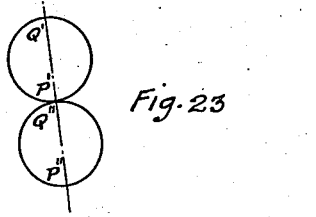
Figure 23 is an end view of Figure 22, showing the pupillary images in tangency.

Figure 22 shows the position of the pupil images when the pupil Q is moved laterally with respect to the optic axis. The pupil images in this case will appear to the observer as shown in Figure 23. An important feature of the optic system herein disclosed is that the lateral movement of the pupil with respect to the optic axis, does not disturb the relative positions or alinement of the pupil images, as it appears to the observer, which greatly facilitates the use of the instrument.

Figure 24:
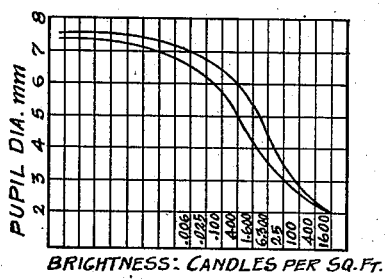
Figure 24 is a graph of the pupillary reaction to varying light intensities.

Figure 24 shows a graph of the pupillary reactions with respect to various light intensities.

In the present invention the lens and reflectors are movable axially toward or away from the pupil in order to obtain a sharp outline of the pupillary images, corresponding to near vision, or far vision, or any intermediate vision of the observer. In Figure 1, on the top of the casing 10, a large round opening is provided and through this opening the frame member 27 is assembled into the casing. The lower end of the frame member 27 forms a horizontal extension 34, Figures 1, 2 and 3, which extension is provided with a slot 35 and in this slot is mounted for sliding motion a member 36, which supports the convex lens 37, the reflector 38, and the pivoted reflector 39. Member 36 is held frictionally by a two-pronged spring 40 which exerts pressure between the sliding support 36 and the under side of the slotted frame extension 34. The underside of the sliding support 36 is provided with a transverse slot 41 which co-operates with a stud 42, Figures 1 and 3. The stud 42 is integral with a knurled wheel 43, Figures 1, 2, 3 and 10, which is mounted for rotation through a hole in the underside of the casing at 44, Figure 1.

Figure 10:
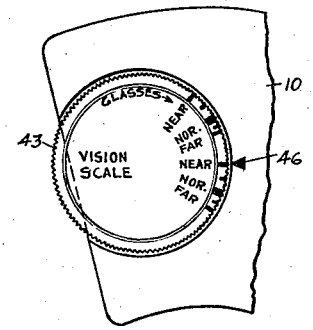
Figure 10 is a partial bottom view showing the vision scale dial.

An arcuate slot 45 also on the underside of the casing, provides clearance for the movement of the stud 42 when the knurled wheel 43 is turned by the fingers for moving the lens 41 together with the reflectors 38 and 39 toward or away from the eye of the observer. In Figure 10 the knurled wheel is shown provided with a vision scale so that the wheel may be preset with respect to the reference mark 46 on the casing 10, according to the condition of observer's eye. Two separate scales are provided; one is used when the observer wears glasses and the other scale is used without glasses. The frame member 34 is fastened to the inside of the casing by the screws 47 and 48, Figures 1 and 2.

The reflector 39 is cemented into a holder 49, two opposed sides of which are provided with short studs 50 and 51, Figures 2 and 3, which fit into holes in the side walls of the support member 36. The sides of the reflector holder straddle the lower reflector 38 which is somewhat narrower than the upper reflector 39, as shown in Figure 2, so that the reflector 39 is pivotally movable with respect to the reflector 38. One side of the reflector holder extends rearwardly and is provided with a pin 52, which is held in contact with an elongated cam member 53 by a spring 54 which is anchored to a hook projecting from the support 36, Figure 3. As the support 36 is moved by the rotation of the wheel 43, the pin 52 slides upon the slightly tapered surface 53a of the cam member 53, thereby imparting a small rocking motion to the reflector 39. The two virtual images of the pupil are brought into a position of tangency by the rocking movement of one of the reflectors, said movement being a measure of the pupil diameter, and hence, indicates the corresponding light intensity falling upon the eye. Hence, in moving the lens and reflector combination toward or away from the pupil for bringing the pupil images into a sharp focus, it is important that this relation of tangency be maintained, and the small rocking motion imparted to the reflector 39 as above explained is for the purpose of maintaining the relation of tangency of the pupillary images during the focusing operation. If the user wears spectacles or glasses, readings may be taken by holding the instrument in contact with the surface of the glasses, but in this case the lens and reflectors must be moved toward the eye in order to compensate for the distance between the pupil and the outside surface of said glasses. The free end of the cam member 53 is likewise provided with a slightly tapering surface 53b, co-operating with the pin 52 for imparting to the reflector 39 a compensating movement in the process of focusing in connection with the use of glasses.

Figure 6:
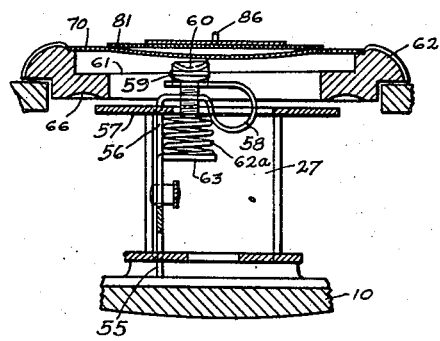
Figure 6 is a partial section taken along line 6—6 Figure 1.

To bring the pupillary images into a position of tangency, the cam member 53, Figure 3, is moved vertically, for imparting to the reflector 39 the required rocking motion. The cam member 53 is provided with a downward projection 55, Figure 3, which slides in a slot in the frame member 34. Integral with the cam member is the upward projection 56 which slides in a slot of an upper horizontal extension 57 of the frame member 27, Figures 1, 2, 3 and 6. As shown in Figure 6, the upward projection 56 is provided with a loop formation 58, which is made of a resilient material, and functions as a spring. A screw 59, Figures 1, 3 and 6, is threaded into the lower part of the loop, while the upper part of the loop presses against the underside of the head of the screw. The upper part of the loop is offset, terminating in a cupped lip 60, which rests upon a circular cam surface 61, which is an integral part of the knurled disc 62. It will be evident from Figures 3 and 6, that as the knurled disc is rotated in a horizontal plane, the cam surface 1 will impart a vertical motion to the cupped lip 60, and thereby to the elongated cam 53, which controls the rocking of the reflector 39. A spring 62a anchored on the underside of the frame member 57 and exerting a downward force upon the projection 63, tends to hold the cupped lip 60 in contact with the cam surface 61. From the above description and from Figures 1, 3 and 6 it will be apparent that by turning the screw 59 the elongated cam 53 will be raised or lowered with respect to the cam surface 61 and thereby the angular relation of the reflectors 38 and 39 may be adjusted, for the purpose of calibrating the instrument.

In calibrating, the reflectors are adjusted to register the tangency of the pupillary images in a predetermined light condition and corresponding to the average size pupil. At the calibrated point the screw head 59 is marked with a dot 64, Figure 1, opposite a reference mark 65 upon the cupped lip. The dot mark is preferably made with some paint or pigment, and its purpose is to fix the position of the calibration. The screw head 59 is further provided with graduated marks as shown in Figure 1 for the purpose of altering its position a known amount, in case the variation from the average pupil in an individual case makes this desirable.

Figure 5:
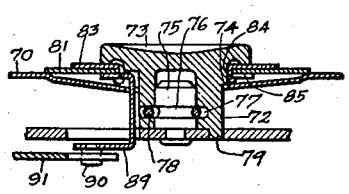
Figure 5 is a partial section taken along line 5—5 Figure 1.

The disc 62 is provided on its underside with an arcuate groove 66, Figure 3, which serves as a race for three spaced ball bearings 67, 68 and 69, Figures 1, 2 and 3. The balls are supported in cup formations on the upper horizontal frame member 57, as shown at 66, Figure 3. The purpose of the ball bearings is to give proper circumferential support to the knurled disc 62 and by its antifriction properties to facilitate the operation of the knurled disc by the fingers; further, the relation of the cam surface 61 to the race 66 opposite it, can easily be fabricated with a high degree of accuracy and it is this factor which controls the rocking motion imparted to the reflector 39. A circular plate 70 rests on a recessed shoulder of the disc 62, Figure 3, and this plate is provided with a small projection 71, Figure 7, which secures said plate on the disc 62 against relative motion, so that when the knurled disc 62 is rotated, the plate 70 will move as if integral with it. At its center the plate 70 is provided with a circular aperture which fits loosely around the cylindrical body 72 of a knob 73 while a shoulder 74 on the knob 73, Figures 3 and 5, bears down on the edge of the circular aperture so that by the plate 70 and the knob 73 the knurled disc 62 is securely held in place.

Figure 4:
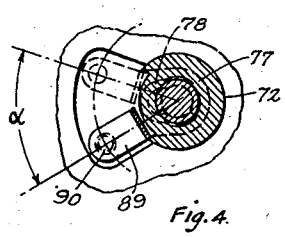
Figure 4 is a partial section taken along line 4—4 Figure 3.

The knob 73 is fastened to the frame member 57 by means of a stud 75 which fits in to a hole provided in the knob 73. The stud 75 has a groove 76 and opposite this groove the knob is provided with a recess 77, Figures 3, 4 and 5, which accommodates a "horseshoe" spring 78 so that when the knob is forced down upon the stud the spring snaps in the groove on the stud and thereby retains the knob in place. A projection 79, Figure 5, fits into a hole in the frame member 57 and prevent the knob from turning. The upper surface of the knob 73 is made concave and serves as a finger rest to facilitate the holding of the instrument, and the turning of the disc 62. In Figures 1 and 3 a projection 80 in the path of a similar projection 80a on the disc 62 acts as a stop, limiting the rotation of the disc in both directions.

Figure 7:
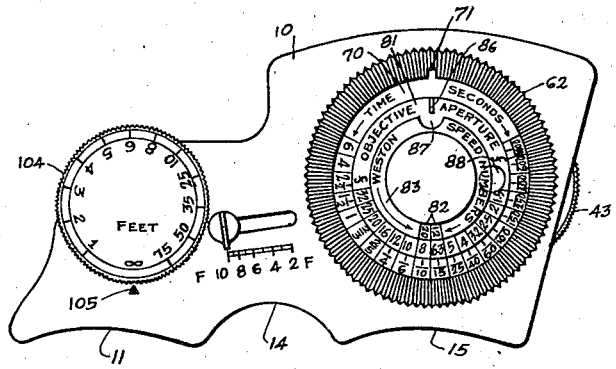
Figure 7 is a top view of the instrument showing the exposure meter and the range finder dials in position.
Figure 8:
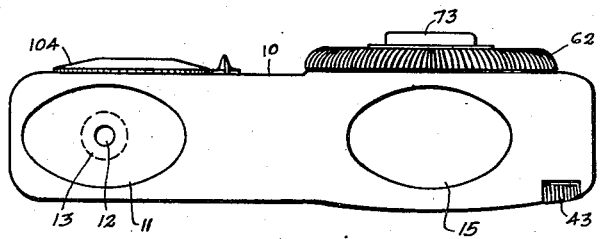
Figure 8 is a front elevation of Figure 7.

In Figure 7 the circular plate 70 is shown with a time scale on its outer edge. Another circular plate 81 disposed above the plate 70 is provided with a series of "stop" numbers indicating the objective aperture, which are adjacent to and are co-ordinated with the numbers of the time scale on plate 70, so that when the disc 62 is adjusted to cause the pupillary images to be brought into alinement, the adjacent pairs of numbers on the time and stop scales will indicate the correct shutter speed, and the corresponding objective aperture. Since the numbers on the time scale correspond to definite pupil diameters, which in turn are influenced by the light intensity, it follows that the numbers on the time scale can also be interpreted in terms of illumination or light values. During the operation of the disc 62 the stop plate 81 remains relatively fixed. The plate 81 is also provided with film speed numbers indicated in Figure 7 as "Weston speed numbers," two of which are visible through an aperture 82 on a plate 83 disposed on top of the plate 81, Figures 3, 5 and 7. The plate 83 extends under the head of the knob 73, and is formed with a downwardly projecting flange or rim 84 which is spun or crimped around a resilient friction ring 85 in such a manner that the plate 81 will be held frictionally but movable between the plate 83 and the friction ring 85.

Figure 9:
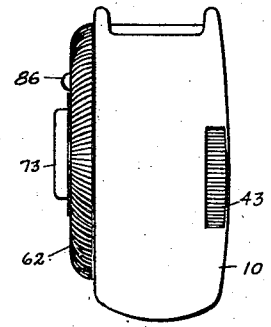
Figure 9 is a side elevation of Figure 7.

To set the stop scale to a desired film speed value, the plate 81 is rotated with respect to the aperture 82, and a projection 86 on the plate 81, Figures 7 and 9, is provided to facilitate this operation. Plate 83, Figure 7, has a semi-circular part 87 cut away and the plate 81 has a similar circular portion 88 cut out in such a way, that the plate 81 may be rotated to bring the portion 88 opposite the cut out 87, thus forming at that point a circular opening which is just above the adjusting screw 59, Figure 1, and is the means by which this screw is made accessible when such an adjustment is desired. The plate 70 is provided with a similar hole or opening opposite the cut out 87, as shown in Figure 3.

The plate 83 is spun or crimped around the friction ring 85 in such a way that relative motion between them is prevented, while the plate 81 is frictionally supported between them, and carried along by them.

In Figure 17 is shown the appearance of the images of the eye when the pupillary images Q and P are in tangency. The rectangular figures A represent the images of the apertures on the two sides of the frame member 27, Figure 11, as reflected from the cornea of the eye. In Figs. 1 and 2, the movable reflector 94 of a range finder is secured in a holder which is pivotally supported in the casing 92 by the pin 98. The upper part of the reflector holder forms a lever arm 99 which extends lengthwise along the casing and is provided at its end with a roller 100 which co-operates with the cam 101. A compression spring 102, anchored on the casing, presses on the lever, holding the roller 100 in contact with its cam. The cam 101 is supported for free rotation upon a stud 103 which is fastened to the top of the casing 92.

Another lever 91 is provided with a stud 106 which slides in a groove in the upper wall of the casing, so as to prevent its movement longitudinally. A roller 107 opposite the stud 106 co-operates with the cam 108, and a spring 109 anchored in the casing 10 presses against the lever 91, holding the roller 107 in contact with the cam 108. The cams 101 and 108 are integrally supported upon their common stud 103, and thereby the movements of the reflector lever arm 99 and of the lever 91 are co-ordinated. The lever 91 is provided with a slot at its free end, which co-operates with the pin 90 on the under side of a downwardly projecting U shaped lug 89, which is part of the friction ring 85, Fig. 5, and by this means movement is transmitted to the plates 81 and 83 for influencing the relation of the time and stop scales in accordance with the setting of the reflector 94, by the operations of the cams 101 and 108.

What I claim as new is:

1. In combination with a light meter, a lens, means for positioning said lens relative to the pupil of the eye, two reflectors, their planes forming an approximate right angle and co-operating with said lens, for forming two virtual images of the pupil, means for altering the angle between the reflectors for bringing the images of the pupil into tangency, a support for said reflectors, and means for moving said support along the optic axis.

2. In combination with a light meter, a lens, means for positioning said lens relative to the pupil of the eye, two reflectors, their planes forming an approximate right angle and co-operating with said lens, for forming two virtual images of the pupil, means for altering the angle between the reflectors for bringing the images of the pupil into tangency, a support for the lens and said reflectors, means for moving the support along the optic axis, and a spring adapted to frictionally hold said support in its position.

3. In combination with an exposure meter, a lens, means for positioning said lens relative to the pupil of the eye, two reflectors, their planes forming an approximate right angle and co-operating with said lens, for forming two vertual images of the pupil, means for altering the angle between the reflectors for bringing the images of the pupil into tangency, a support for the lens and said reflectors and means for sliding said support along the optic axis; a disc mounted for rotation, and connection between the disc and said support for sliding said support along the optic axis by the operation of said disc.

4. In an exposure meter adapted to measure the diameter of the pupil of the eye, a lens, two reflectors, their planes forming an approximate right angle and co-operating with said lens, means for positioning the lens relative to the pupil, a casing having an aperture for the entrance of light rays to illuminate the pupil, means for limiting such rays to a predetermined angle, and provision for altering the angle between the reflectors to bring the two virtual images of the pupil, formed by the lens and the reflectors, into a position of tangency.

5. In a light meter adapted to measure the diameter of the pupil of the eye, a lens, two reflectors, their planes forming an approximate right angle and co-operating with said lens, a casing for the lens and said reflectors and means for positioning the lens with respect to the pupil of the eye, said casing having an aperture for the entrance of light rays and a parabolic type reflector fixed on one side of the aperture adapted to reflect rays within a predetermined field for the illumination of the pupil, and means for altering the angle between said reflectors to bring the two virtual images of the pupil, formed by the lens and the reflectors, into a position of tangency.

6. In a light meter adapted to measure the diameter of the pupil of the eye, a lens, two reflectors, their planes forming an approximate right angle and co-operating with said lens, a casing for the lens and said reflectors and means for positioning the lens with respect to the pupil of the eye, said casing having two apertures on opposite sides of the optic axis for the entrance of light rays, and two reflectors fixed on the sides of the apertures adapted to reflect rays within a predetermined angle for the illumination of the pupil, and means for altering the angle between said reflectors to bring the two virtual images of the pupil, formed by the lens and the reflectors, into a position of tangency.

7. In combination with a light meter, a lens, means for positioning said lens relative to the pupil of the eye, two reflectors, their planes forming an approximate right angle and co-operating with said lens for forming two virtual images of the pupil, a support for the lens and said reflectors, and means for sliding said support along the optic axis; a pivotal mounting for one of the reflectors on said support, and a cam member adapted to impart a rocking movement to the reflector about its pivot during the sliding motion of said support for bringing the images of the pupil into tangency.

8. In a light meter for estimating illumination by the measurement of the diameter of the pupil of the eye, two reflectors; a screw, and means for adjusting the angular relation of the reflectors by said screw in accordance with a predetermined pupil diameter and provision for indicating said adjustment on the screw; a graduated scale for said screw, whereby the angular relation of said reflectors may be readjusted in accordance with the variations of the pupil diameters of the eye.

9. In an exposure meter, a scale of time values, a scale of stop values and means for adjusting the relation between said scales; two reflectors, their planes forming an approximate right angle and means for viewing the images of the pupil of the eye formed by said reflectors, and provision for altering the angle of the reflectors to bring the pupil images into tangency by the adjustment of said scales.

10. In an exposure meter, a scale of time values, a scale of stop values and means for adjusting the relation between said scales; a scale of film speed values, and means for modifying the relation between the time and stop scales in accordance with a predetermined film speed value; two reflectors, their planes forming an approximate right angle, and means for viewing the images of the pupil of the eye formed by said reflectors, and provision for altering the angle of the reflectors to bring the pupil images into tangency by the adjustment of said scales.

11. In a light meter, two reflectors, their planes forming an approximate right angle and means for positioning said reflectors relative to the pupil of the eye for viewing the pupil images formed by said reflectors; means for altering the angle of the reflectors to bring the pupil images into tangency; means for moving the reflectors toward or away from the eye for shifting the pupil images into the position of distinct vision, and provision for imparting a compensating movement to one of said reflectors to maintain the tangency of the pupil images.

12. In a light meter, two reflectors, their planes forming an approximate right angle and means for positioning said reflectors relative to the pupil of the eye for viewing the pupil images formed by said reflectors; means for altering the angle of the reflectors to bring the pupil images into tangency; means for moving the reflectors with respect to the pupil, and a scale indicating the position of the reflectors for the point of distinct vision.

13. In a light meter, two reflectors, their planes forming an approximate right angle and adapted to form images of the pupil of the eye; means for viewing said images directly, or with glasses; means for altering the angle between the reflectors to bring the pupil images into tangency; means for moving the reflectors with respect to the pupil, a scale indicating the position of the reflectors for the direct vision of the pupil images, and another scale indicating the position of the reflectors for viewing the pupil images with glasses.

14. In a light meter, two reflectors, their planes forming an approximate right angle and means for positioning the reflectors with respect to the pupil of the eye for viewing the images of the pupil formed by said reflectors; means for altering the angle between said reflectors for bringing the pupil images into tangency, and provision for measuring the magnitude of said angle.

15. In a light meter, two reflectors, their planes forming an approximate right angle and means for positioning said reflectors relative to the pupil of the eye; a case for said reflectors having an aperture adapted for the entrance of light for influencing the diameter of the pupil; means for altering the angle of said reflectors for bringing the pupil images into tangency, and a co-operating scale device for indicating the light values incident upon the pupil.

NICHOLAS MILLER.